(12) United States Patent
Bernard et al.

(10) Patent No.: US 9,573,248 B2
(45) Date of Patent: Feb. 21, 2017

(54) FOREIGN OBJECT REMOVAL FOR ABRASIVE RECYCLING SYSTEM

(71) Applicant: ZULUBOY, INC., Kent, OH (US)

(72) Inventors: Alan James Bernard, Hartville, OH (US); Adam Paul Carder, Copley, OH (US)

(73) Assignee: Zulluboy, Inc., Kent, OH (US)

( * ) Notice: Subject to any disclaimer, the term of this patent is extended or adjusted under 35 U.S.C. 154(b) by 0 days.

(21) Appl. No.: 14/815,712

(22) Filed: Jul. 31, 2015

(65) Prior Publication Data
US 2016/0151884 A1    Jun. 2, 2016

Related U.S. Application Data

(60) Provisional application No. 62/086,622, filed on Dec. 2, 2014.

(51) Int. Cl.
*B24C 9/00* (2006.01)

(52) U.S. Cl.
CPC ................... *B24C 9/006* (2013.01)

(58) Field of Classification Search
CPC .......... B24C 9/006; B24C 3/065; B24C 3/067; B24C 9/00; B24C 9/003; B24B 55/12
USPC ................... 451/56, 36–40, 87–88
See application file for complete search history.

(56) References Cited

U.S. PATENT DOCUMENTS

| | | | | |
|---|---|---|---|---|
| 2,347,334 A | * | 4/1944 | Schmieg ............... B24B 55/06 | 126/299 R |
| 3,149,445 A | * | 9/1964 | Nolan .................... B24C 9/003 | 451/38 |
| 3,824,738 A | * | 7/1974 | Hall ....................... B24C 3/325 | 451/38 |
| 3,863,394 A | * | 2/1975 | Dumentat ............. B23P 23/04 | 451/259 |
| 3,865,629 A | * | 2/1975 | Dankoff ................. B03B 7/00 | 134/12 |
| 3,913,271 A | * | 10/1975 | Boettcher ........... B24B 27/0023 | 414/223.01 |
| 4,120,121 A | * | 10/1978 | Surman ................. B24B 55/12 | 451/28 |
| 4,671,708 A | * | 6/1987 | Hurd ................... B23Q 11/006 | 15/345 |
| 4,702,042 A | * | 10/1987 | Herrington ........... B24C 1/045 | 451/40 |
| 4,704,823 A | * | 11/1987 | Steinback ............. B24B 7/06 | 451/261 |
| 4,719,721 A | * | 1/1988 | Stump ................. B24B 41/068 | 198/689.1 |
| 4,800,063 A | * | 1/1989 | Mierswa .............. B24C 7/0084 | 376/310 |

(Continued)

OTHER PUBLICATIONS

Office action dated Aug. 19, 2016 from U.S. Appl. No. 14/815,744, filed Jul. 31, 2015.

*Primary Examiner* — George Nguyen
(74) *Attorney, Agent, or Firm* — Sunstone IP

(57) ABSTRACT

An abrasive recycling system is provided. The abrasive recycling system includes a vacuum, wherein the vacuum is variably positioned in relation to a mixture of dry abrasive and foreign material and is configured to extract foreign material from the mixture during abrasive recycling performed by an abrasive recycler. Methodology corresponding to the removal of foreign objects by an abrasive recycling system is also provided.

22 Claims, 2 Drawing Sheets

(56) References Cited

U.S. PATENT DOCUMENTS

| | | | | |
|---|---|---|---|---|
| 4,827,678 A | * | 5/1989 | MacMillan | B24C 1/086 451/39 |
| 4,943,368 A | * | 7/1990 | Gilbert | B03B 9/061 209/12.2 |
| 5,071,541 A | * | 12/1991 | Thompson | B03B 4/00 209/19 |
| 5,231,804 A | * | 8/1993 | Abbott | B24C 9/003 451/76 |
| 5,527,204 A | | 6/1996 | Rhoades | |
| 5,595,461 A | * | 1/1997 | Miller | B65G 53/42 406/152 |
| 5,637,029 A | * | 6/1997 | Lehane | B08B 3/02 451/39 |
| 5,799,643 A | | 9/1998 | Miyata et al. | |
| 5,911,959 A | * | 6/1999 | Wold | B03B 1/00 23/302 T |
| 6,090,197 A | | 7/2000 | Vivian et al. | |
| 6,120,351 A | * | 9/2000 | Zeng | B24C 1/045 451/2 |
| 6,361,416 B1 | | 3/2002 | Hopkins et al. | |
| 6,362,103 B1 | | 3/2002 | Watts | |
| 6,372,111 B1 | | 4/2002 | Watts | |
| 6,461,524 B1 | | 10/2002 | Tsuihiji et al. | |
| 6,805,618 B1 | | 10/2004 | Ward et al. | |
| 7,282,074 B1 | * | 10/2007 | Witter | B01D 45/12 451/453 |
| 7,585,201 B2 | * | 9/2009 | Kanai | B24C 1/00 451/2 |
| 7,775,854 B1 | | 8/2010 | Boman et al. | |
| 8,147,293 B2 | | 4/2012 | Hashish | |
| 8,771,040 B1 | * | 7/2014 | Lyras | B24C 9/006 451/87 |
| 9,022,835 B1 | * | 5/2015 | Gus | B24C 9/006 451/87 |
| 2003/0092364 A1 | * | 5/2003 | Erickson | B24C 1/045 451/75 |
| 2007/0218808 A1 | | 9/2007 | Shimizu | |
| 2008/0014837 A1 | | 1/2008 | Fujinaga | |
| 2014/0045409 A1 | * | 2/2014 | Zhang | B24C 7/0046 451/2 |

* cited by examiner

FOREIGN OBJECT REMOVAL FOR ABRASIVE RECYCLING SYSTEM

CROSS-REFERENCE

This application claims priority to U.S. Provisional Patent Application No. 62/086,622 entitled. FOREIGN OBJECT REMOVAL FOR ABRASIVE RECYCLE, filed Dec. 2, 2014, the contents of which is incorporated herein by reference in its entirety.

BACKGROUND

Abrasive jet cutting, such as waterjet cutting, is often used during fabrication of a work piece, such as a machine part, and is especially useful when the materials being cut are sensitive to the high temperatures generated by other cutting methods. It is desirable to recycle the abrasive material used by abrasive jet cutting machines. When cutting with an abrasive jet, it is common to utilize a sacrificial layer (of plywood or plastic, or similar material). Often, however, the utilization of a sacrificial cutting layer introduces foreign material into the resultant abrasive slurry, as the kerf material (i.e. the material removed from the cut work piece and the cut sacrificial layer) becomes intermingled with abrasive, so that particles and/fibers from the sacrificial cutting layer reside within the slurry. Current abrasive recycling devices and systems are not able to effectively differentiate between abrasive particles and foreign materials of a similar size. These foreign materials create undesirable issues if they exist in the final recycled abrasive. Hence, a need exists for an abrasive recycler that more effectively removes foreign material.

SUMMARY

A described aspect provides an on demand fluid jet abrasive recycling system for removing foreign material from a mixture produced by a fluid jet machine, wherein the mixture contains an abrasive material and a foreign material, the system comprising a conveyor in fluid communication with the fluid jet machine and a vacuum positioned adjacent to the conveyor, the vacuum configured to extract at least a portion of the foreign material from the mixture.

BRIEF DESCRIPTION OF THE DRAWINGS

The described aspects are best understood from the following detailed description when read in connection with the accompanying drawing(s). Included in the drawing(s) are the following figure(s).

DETAILED DESCRIPTION

Figure 1:
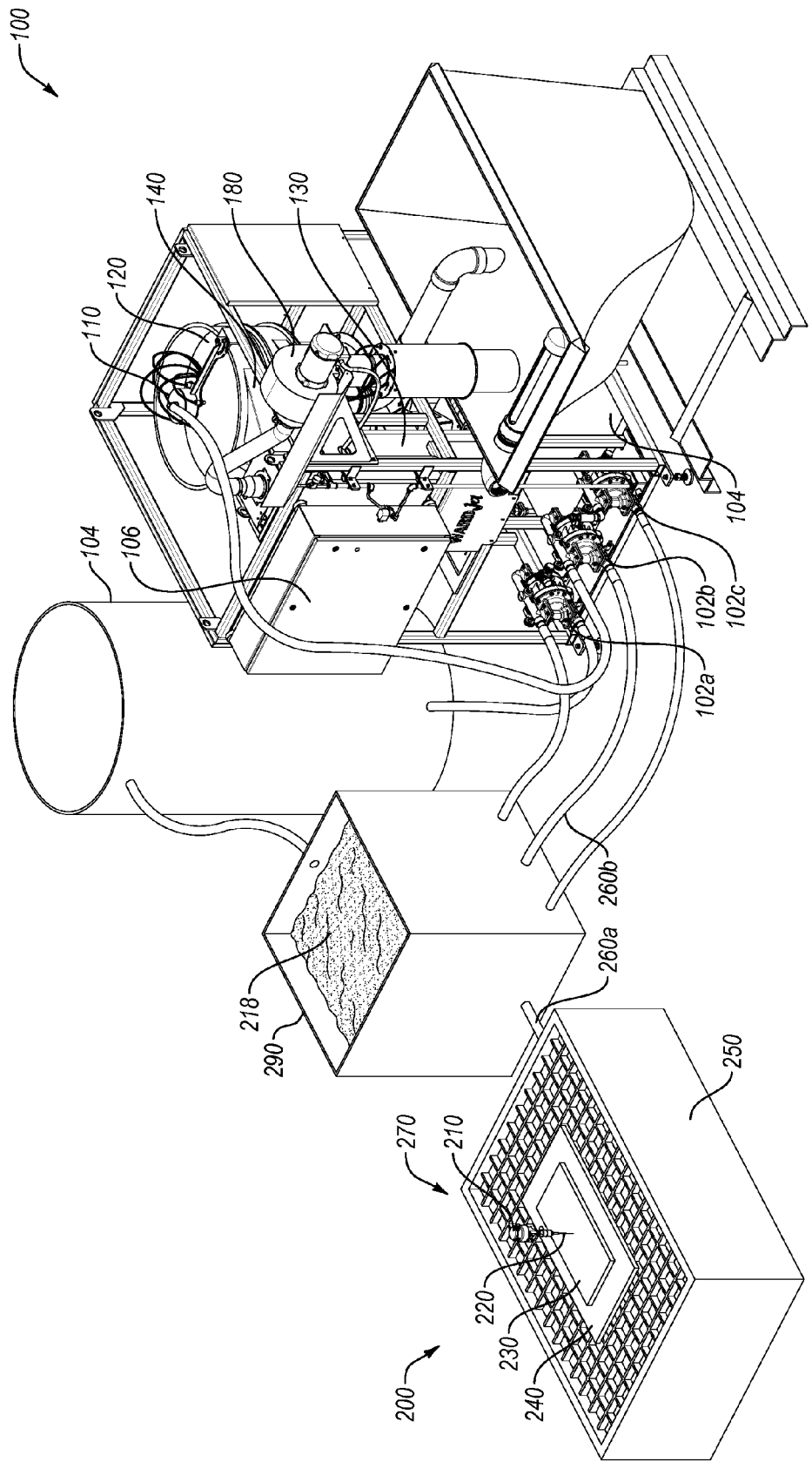
FIG. 1 is a perspective view of an abrasive recycling system associated with a fluid jet machine.

While this disclosure contains many specific details, it should be understood that various changes and modifications may be made without departing from the scope of the technology herein described and the appended claim(s). The scope of the technology shall in no way be construed as being limited to the number of constituting components, the corresponding relationship, if any, of constituting components, the materials thereof, the shapes thereof, the relative arrangement thereof, the temperature employed, the order of combination of constituents thereof, etc., and are disclosed simply as examples. The depictions and schemes shown herein are intended for illustrative purposes and shall in no way be construed as being limiting in the number of constituting components, connectivity, methodological steps, the materials thereof, the shapes thereof, the relative arrangement thereof, the order of system interactions thereof, etc., and are disclosed simply as an aid for understanding. The features and advantages of the described embodiments are illustrated in detail in the accompanying drawing(s), wherein like reference numerals refer to like elements throughout the drawing(s). As a preface to the detailed description, it should be noted that, as used in this specification and the appended claim(s), the singular forms "a", "an" and "the" include plural referents, unless the context clearly dictates otherwise.

Many users of fluid jet machines, including abrasive jet cutting devices, such as waterjet machines, have the need to cut on and through sacrificial layers of wood, plastic, and other materials. The kerf material and general debris from such cutting often prevents the users from effectively recycling abrasive. Common abrasive recycling systems make attempts at removing foreign material introduced into the resultant slurry from the kerf of the sacrificial layers, by employing devices such as an initial screen (a primary screen used to screen the wet slurry), a drying apparatus (a dryer box configured to remove moisture and dry the slurry), a dust collector (a blower or suction device configured to extract dust from the drying stage of the recycling system), and a final screen (a secondary or tertiary screen configured to screen the dried abrasive and remove leftover foreign debris). While common abrasive recycling systems remove an appreciable portion of foreign material from the abrasive through removal by the initial screen, the drying apparatus, the dust collector, and the final screen, unfortunately, some of the foreign particles/fibers are of sufficient size to make it through the attempted removal process, thereby remaining present in the recycled abrasive. The presently described embodiments provide solutions for the problems associated with separating foreign material from recycled abrasive.

With reference to the drawing(s), FIG. 1 depicts a perspective view of an abrasive recycling system 100 associated with a fluid jet machine 200. The fluid jet machine 200 can include a fluid jet 210 through which abrasive 220 is expelled onto a work piece 230. The expelled abrasive 220, portions of the work piece 230 and portions of a sacrificial underlayment 240 can be collected in a collection bin 250 to thereby form a used mixture 218. The used mixture 218 can be transported to the abrasive recycling system 100 by a transport hose 260, for example. Also, the used mixture 218 can be transported to abrasive recycling system 100 via an intermediate bin or collector 290, when the abrasive recycling system 100 and the fluid jet machine 200 are in close proximity, such as in the same building, for example. In this example, the used mixture 218 can be transported to the bin 290 by, for example, a hose 260a. Then, another hose 260b can be connected to the bin 290 on one end and then on the other end be connected to the abrasive recycling system 100. In this manner, the abrasive recycling system 100 can be associated with the fluid jet machine 200, and can be described as being on demand or real-time. Furthermore, the abrasive recycling system 100 is associated with the fluid jet machine 200 when both are on site. It is contemplated, however, that once the used mixture 218 is positioned in the bin 290, the bin 290 does not need to be fluidly connected to the collection bin 250 in order to operate the abrasive recycling system 100. As used herein, the fluid jet machine 200 can include the intermediate bin or collector 290.

The fluid jet machine 200 can be various machines designed to expel abrasive sufficient to impact a work piece. For example, in one embodiment, the fluid jet machine 200 is a water jet machine. In another embodiment, the fluid jet machine can be a sand blaster. Reference to the used mixture 218 will generally be referred to hereinafter as a slurry or an abrasive slurry, which implies a mixture of water and other material. However, this reference does not limit the used mixture to only those that contain water, as the case may be.

Figure 2:
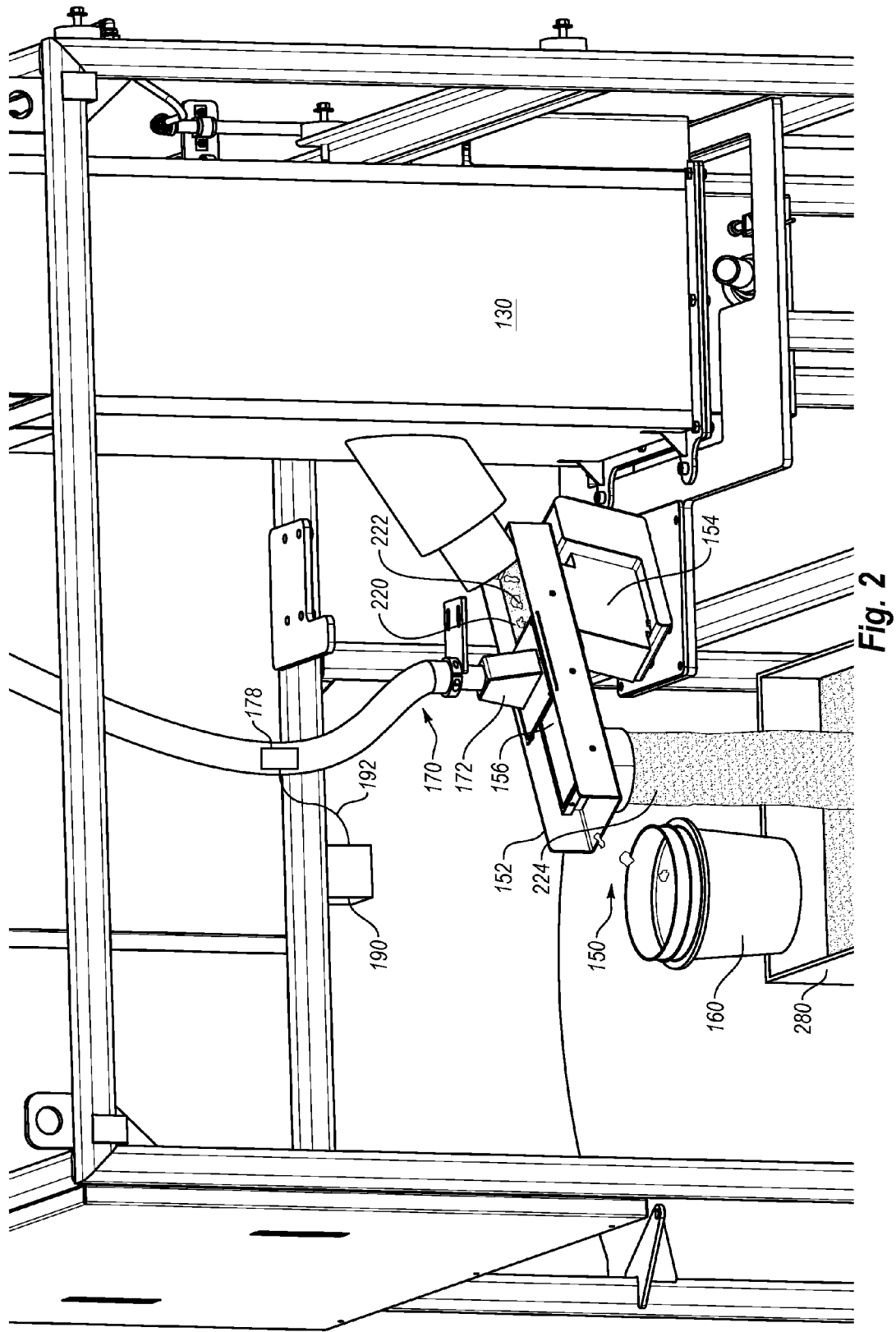
FIG. 2 is a front elevation view of the abrasive recycling system.

In the illustrated embodiment, with reference being made to FIG. 1 and FIG. 2, the abrasive recycling system 100 may include an inlet 110 through which the abrasive slurry 218 may enter, a drying apparatus 130 adjacent to the inlet 110 and used to remove moisture from the slurry, and a secondary screening assembly 150. The abrasive recycling system 100 may also include one or more pumps 102. In the illustrated embodiment, the abrasive recycling system 100 includes a first pump 102a configured to pump water from a water supply 108, such as a tank, to the intermediate collector 290, a second pump 102b configured to pump the slurry from the intermediate collector 290 to the inlet 110, and a third pump 102c configured to pump fluid, such as water or air, into the intermediate collector 290 to agitate the slurry 218 contained in the intermediate collector 290. The abrasive recycling system 100 may also include a load cell 104 configured to measure the weight of recycled abrasive material 224 processed by the abrasive recycling system 100. Furthermore, a control box 106 may be employed to assist with controlling various aspects of the abrasive recycling system 100.

The inlet 110 may include an initial screen 120, such as a primary screen, onto which an abrasive slurry 218 is fed. The initial screen 120 may perform a primary screening of the slurry 218 to remove small objects and foreign material from the slurry, before the slurry enters the drying apparatus 130 such as a dryer box. In the illustrated embodiment, the inlet 110 is positioned above the dryer box 130, such that gravity forces the slurry thru the initial screen 120. The initial screened slurry moves from the screen to the dryer box 130 thru a channel 140. In this manner, the dryer box 130 is in fluid communication with the inlet 110. The dryer box 130 is adapted to utilize heat and/or air to remove moisture from the slurry to thereby create a dry mixture of abrasive and foreign particles, such as pieces of the work piece 230 or the sacrificial underlayment 240. The dry mixture, i.e., dry abrasive and any remaining foreign particles, come out of the dryer box 130 onto the secondary screening assembly 150.

The secondary screening assembly 150 may include a tray 152 for receiving the dry mixture from the dryer box 130, a vibrating feeder 154 to help facilitate transport of the dried media down the tray 152 through several stations, and a secondary screen 156, such as a 30 mesh screen, for example, that allows smaller abrasive particles to drop through into a collection bag, bin or other component 280. This collected material represents the finished recycled abrasive product and end goal of the abrasive recycling system 100. Any material too large to fall through the secondary screen 156 as the screen 156 is agitated by the vibrating feeder 154 will continue on and drop off the end of the tray 152 into a waste bin 160. It is contemplated that the tray 152 and vibrating feeder 154 can be replaced by a conveying system, such as an endless belt, to facilitate transport of the dry mixture from the dryer to the secondary screen 156.

The secondary screen assembly 150 may include a vacuum 170 adjacent to the tray 152, the vacuum 170 being positioned and configured to evacuate foreign particles/objects/material 222, such as wood chips, plastic, or other foreign non-abrasive materials. The pressure of the vacuum 170 can be adjusted so as to extract the less dense foreign material 222 without substantially extracting abrasive material 220. For example, the vacuum 170 can be adjusted by using a controller 178, such as a dial, a slider, or even a series of buttons that are associated with different pressures. In this manner, the vacuum 170 can be adjusted to accommodate for different sizes, weights and densities of foreign material 222.

The vacuum 170 may include a vacuum nozzle 172 positioned between the dryer box 130 and the final or secondary screen 156 of the secondary screening assembly 150. In this manner, the abrasive recycling system 100 is able to separate out the less dense foreign materials 222 like wood and plastic pieces, while leaving the abrasive 220. Furthermore, the vacuum nozzle 172 may be configured for variable adjustment of distance between the end of the vacuum nozzle 172 and the tray 152, as well as size, to facilitate fine tuning for targeting of specific materials. Moreover, the vacuum 170 pressure or suction force may be optionally created by utilizing pressure differentials generated by a dust collector 180, although those in the art will appreciate that a separate vacuum generation device may also be employed. Use of a vacuum on the dried abrasive prior to final screening facilitates effective removal of foreign non-abrasive materials.

The abrasive recycling system 100 may also include one or more sensors 190 adapted to sense at least one characteristic of the foreign material 222. The one or more sensors 190 may be in electronic communication with the vacuum 170 via a wire 192. The sensors 190 and vacuum 170 may include logic or functionality to automatically adjust aspects of the vacuum 170 in response to the sensed characteristic. In one embodiment, the sensor 190 may include a weight scale adapted to sense the weight of the foreign material 222 vacuumed from the dried mixture. In another embodiment, the sensor 190 may include a camera system configured to sense how much foreign material 222 is in the dried mixture. It is contemplated that multiple sensors may be utilized to estimate the amount of foreign material 222 removed by the vacuum 170.

As noted, an additional feature of the abrasive recycling system 100 includes the ability to fine-tune various characteristics of the vacuum 170, including: vacuum pull or suction force, the distance between the vacuum orifice and the dried abrasive, and size of the vacuum. Additionally, the controller 178 may also be utilized by itself or in connection with one or more of the foregoing, to adjust the characteristic of the vacuum 170. This allows a user to dial in the system 100 based upon the specific material that is desirable to extract. In another embodiment, presets for the vacuum 170 settings may be provided to a user corresponding to extraction of common foreign materials (such as wood, plastic, etc.) to accommodate removal of the common foreign materials used in the cutting industry.

Initial testing of the effectual operability of an embodiment of an abrasive recycling system 100 was carried out using a shop vacuum and packing tape to serve as the vacuum nozzle 172 functional with the secondary screening assembly 150 of the abrasive recycling system 100. While simple, the concept was proven and approximate dimensions of the nozzle and vacuum pressure were achieved.

In a broader application, a user may calibrate the abrasive recycling system 100 for removal of a particular material by starting with standard vacuum orifice, such as for example a size of ½" to 1½". By utilizing a potential vacuum of 1-5" of water, a user may be able to lower the vacuum nozzle 172 toward a sample of contaminated abrasive on the tray 152. When the foreign material 222 begins to be evacuated, the user can then iteratively, or otherwise, determine if the sample abrasive 220 remaining is sufficiently clean. If not, the vacuum nozzle 172 can be lowered further with the understanding that the closer the vacuum nozzle 172 is to the abrasive 220, the more abrasive 220 may be removed along with the contaminated foreign material 222. The distance of the vacuum nozzle 172 from the tray 152 or the secondary screen 156 may vary, for example, from ⅜" to 2". If the distance of the vacuum nozzle 172 is not sufficient to achieve the desired results, the user can reduce the vacuum strength, or modify the vacuum orifice of the vacuum nozzle 172 to increase or decrease the volume of air being pulled by the vacuum 170. Thus, modification of the vacuum 170 strength, vacuum nozzle orifice, and distance between the vacuum nozzle orifice and the contaminated abrasive may result in effective removal of the foreign materials 222.

With further reference to FIG. 1 and FIG. 2, methodology corresponding to the removal of foreign objects by an abrasive recycling system 100 is described.

In one embodiment, a method for removing foreign objects 222 from a liquid jet abrasive recycling process may include extracting a mixture from a fluid jet machine 200, the mixture containing liquid, abrasive 220, and foreign objects 222. Next, the mixture can be screened at an initial screen 120 to extract at least a portion of the foreign objects 222 from the mixture. Then, moisture from the screened mixture can be removed in a dryer 130, thereby drying the screened mixture. Furthermore, the abrasive 220 and foreign objects 222 can be positioned from the drier 130 onto a conveyor, such as a tray 152. Thereafter, a vacuum 170 may be applied to the mixture of dried abrasive 220 and foreign objects 222 while the abrasive 220 and foreign objects 222 move along the conveyor to extract at least an additional portion of the foreign objects 222 from a portion of the mixture.

An additional step may be employed of screening at a second screen 156 the abrasive 220 and foreign objects 222 to remove additional foreign objects 222 from a portion of the mixture. Also, the abrasive 220 and foreign objects 222 may be vibrated by the vibrating feeder 154 when positioned on the conveyor 152. Additionally, the method may further include the step of adjusting the vacuum pressure applied by the vacuum 170 while the abrasive 220 and foreign objects 222 move along the conveyor 152. The method may further include the step of collecting the abrasive 220 from the mixture after application of the vacuum 170 to the abrasive 220 and foreign objects 222. Furthermore, the step of applying a vacuum 170 may include extracting a majority of remaining foreign objects 222 from the abrasive 220 and foreign object 222 mixture.

In addition to the method described above, a first methodological step may include the provision of an abrasive and non-abrasive material mixture to an initial or primary screen 120, to initially remove foreign material 222 and other contaminant objects from the mixture. A further methodological step may include moving the mixture through a drying apparatus, such as a dryer box 130, to remove moisture from the mixture. Once the mixture is dry, an additional methodological step may include moving the dried material onto a tray 152 of a secondary screening assembly 150. A vibrating feeder 154 may be employed to help move the dried material through and/or along the tray 152. Advantageous methodology may include moving the dried material under a vacuum 170 to extract lighter or less dense non-abrasive, although often similarly-sized, foreign objects 222 from the dried mixture leaving significantly contaminant-free abrasive material to be screened a final time by falling through a final secondary screen 156 to achieve a desired consistency of size. The screened and recycled abrasive material 224 can fall into bags, bins or other transport devices to be moved into position for reuse in cutting by an abrasive jet cutting machine. Any material that is too large to fall through the secondary screen 156 will continue on and drop off the end of the tray 152 into a waste bin 160 or other collection device. The vacuumed foreign material can be collected in the dust collector 180, or can be collected in a separate collection component. Depending on the type and consistency of collected foreign material, it too may possibly be recycled in some manner.

Although various aspects are illustrated and described herein with reference to specific embodiments, the aspects, in whole and in part, are not intended to be limited to the details shown. Rather, various modifications may be made in the details within the scope and range of equivalents of the claims without departing from the invention.

What is claimed is:

1. A liquid jet abrasive recycling system, the system comprising:
    a slurry inlet associated with a liquid jet cutting table to receive a slurry produced by the liquid jet cutting table, the slurry containing liquid, abrasive, and foreign particles;
    a dryer system adjacent to the slurry inlet, wherein the dryer system is configured to remove liquid from the slurry thereby forming an abrasive and foreign particle mixture;
    an abrasive collector in communication with the dryer system; and
    a vacuum positioned between the dryer and the abrasive collector, the vacuum configured to extract foreign particles from the mixture.

2. The liquid jet abrasive recycling system according to claim 1, wherein the foreign particles comprise one or more of wood, plastic and composite materials.

3. The liquid jet abrasive recycling system according to claim 1, wherein the foreign particles comprise a removed portion of a sacrificial underlayment positioned on the liquid jet cutting table.

4. The liquid jet abrasive recycling system according to claim 1, further comprising a control mechanism for selectively adjusting a pressure generated by the vacuum.

5. The liquid jet abrasive recycling system according to claim 1, further comprising a sensor in electronic communication with the vacuum, wherein the sensor senses at least one characteristic of the foreign particles.

6. The liquid jet abrasive recycling system according to claim 5, wherein the sensed characteristic is the amount of foreign particles extracted by the vacuum.

7. The liquid jet abrasive recycling system according to claim 5, wherein the vacuum can be automatically adjusted based on the characteristic of the foreign particles sensed by the sensor.

8. The liquid jet abrasive recycling system according to claim 5, wherein the sensor comprises a weight scale.

9. The liquid jet abrasive recycling system according to claim 5, wherein the sensor comprises a camera.

10. The liquid jet abrasive recycling system according to claim 1, further comprising an intermediate slurry collector positioned between the liquid jet table and the slurry inlet.

11. The liquid jet abrasive recycling system according to claim 1, wherein the recycling system is not fluidly coupled to the table during operation of the recycling system.

12. An on demand fluid jet abrasive recycling system for removing foreign material from a mixture produced by a fluid jet machine, wherein the mixture contains an abrasive material and a foreign material, the system comprising:
 a conveyor associated with the fluid jet machine;
 a vacuum positioned adjacent to the conveyor, the vacuum configured to extract at least a portion of the foreign material from the mixture; and
 a dryer configured to receive the mixture therein and remove liquid from the mixture.

13. The fluid jet abrasive recycling system according to claim 12, further comprising a screen configured to separate a first portion of the foreign material from the abrasive material as the mixture from the fluid jet machine passes over the screen.

14. The fluid jet abrasive recycling system according to claim 12, wherein the fluid jet machine is a liquid jet cutting table.

15. The fluid jet abrasive recycling system according to claim 12, wherein the foreign material comprises at least one of wood, plastic, composite materials, and a removed portion of a sacrificial underlayment from the fluid jet machine.

16. The fluid jet abrasive recycling system according to claim 12, wherein a majority of material extracted by the vacuum is the foreign material.

17. A method for removing foreign objects from a liquid jet abrasive recycling process, the method comprising:
 extracting a mixture from a liquid jet system, the mixture containing liquid, abrasive, and foreign objects;
 screening the mixture to extract at least a portion of the foreign objects from the mixture;
 drying the screened mixture in a dryer;
 positioning the abrasive and foreign objects from the drier onto a conveyor; and
 applying a vacuum to the abrasive and foreign objects while the abrasive and foreign objects moves along the conveyor to extract at least an additional portion of the foreign objects from a portion of the mixture.

18. The method according to claim 17, further comprising the step of screening at a second screen the abrasive and foreign objects to remove additional foreign objects from a portion of the mixture.

19. The method according to claim 17, further comprising the step of vibrating the abrasive and foreign objects when it is positioned on the conveyor.

20. The method according to claim 17, further comprising the step of adjusting the vacuum pressure applied by the vacuum while the abrasive and foreign objects move along the conveyor.

21. The method according to claim 17, further comprising the step of collecting the abrasive from the mixture after application of the vacuum to the abrasive and foreign objects.

22. The method according to claim 17, wherein applying a vacuum comprises extracting a majority of remaining foreign objects from the abrasive and foreign objects.

* * * * *